July 10, 1956

C. W. BROWN 2,753,558

APPARATUS FOR DRIVING NAILS

Filed July 2, 1954

INVENTOR.
Chandler W. Brown
BY
Emery, Varney, Whittemore & Dix
ATTORNEYS

United States Patent Office 2,753,558
Patented July 10, 1956

2,753,558
APPARATUS FOR DRIVING NAILS
Chandler W. Brown, Hancock, Mass.

Application July 2, 1954, Serial No. 441,053

5 Claims. (Cl. 1—1)

This invention relates to an apparatus for driving nails.

It is an object of the invention to provide an apparatus for driving a nail in which the nail is used initially in the manner of a drill, being rotated on its longitudinal axis as it is held in engagement with the workpiece to cause it to bore into the workpiece. After the nail has been driven a sufficient distance, it may be driven home by impact.

Other objects and advantages of the invention will appear hereinafter.

A preferred embodiment of the invention selected for purposes of illustration is shown in the accompanying drawings, in which, Figure 1 is a vertical section through the apparatus, showing the gripping jaws in open position.

Figures 1, 2, 3, 4:
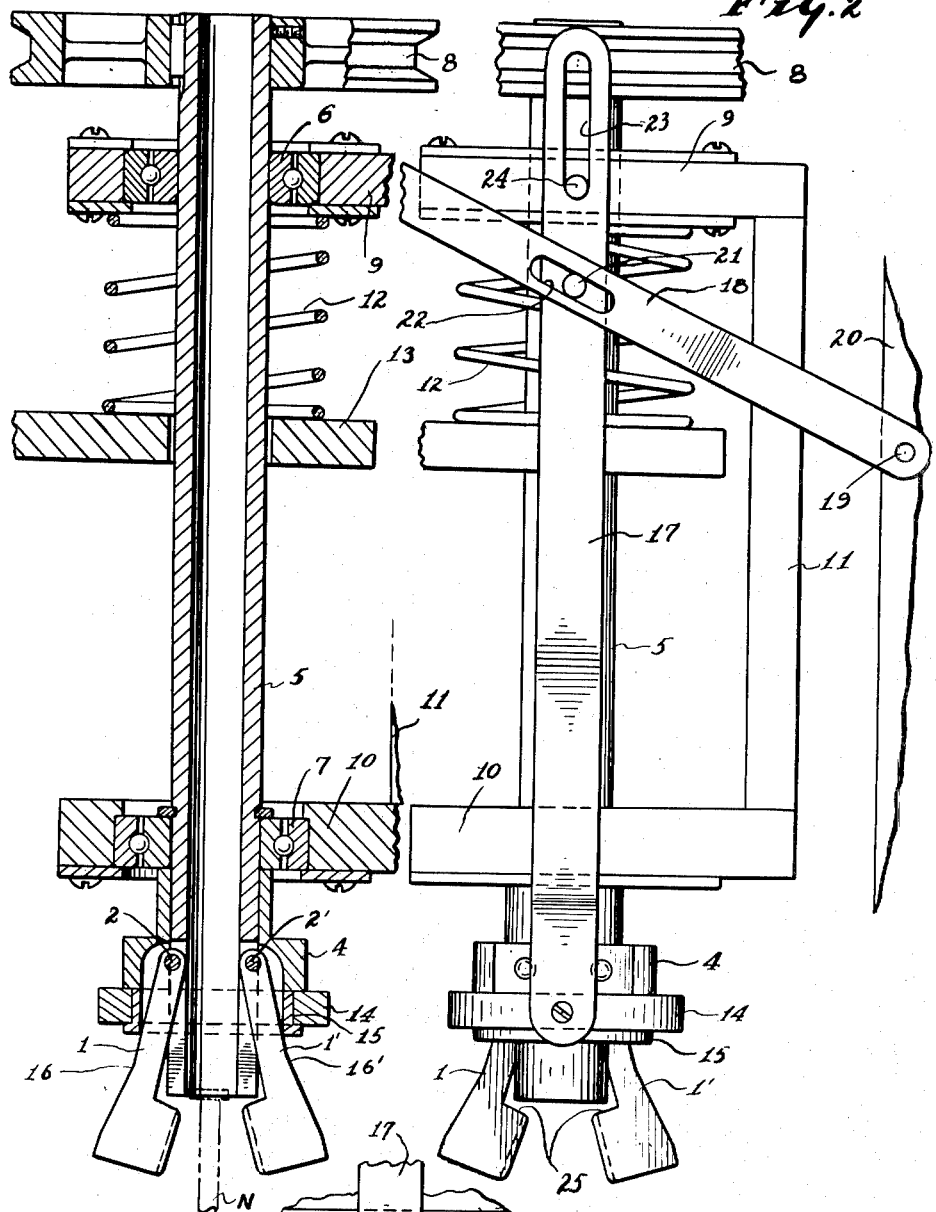
Figure 2 is a side elevation.
Figure 3 is a partial vertical section, showing the gripping jaws in closed position.
Figure 4 is a transverse section on the line 4—4 of Figure 3.

According to the present invention the shank of the nail to be driven is gripped in any suitable manner, preferably immediately below the head and the nail is rotated about its longitudinal axis. While so rotated, the point is brought into and held in engagement with the workpiece. By applying longitudinal pressure through the nail while continuing to rotate it, the nail bores into the workpiece in the manner of a drill. This is continued until the nail has been partially embedded in the workpiece, after which the nail may be driven home by impact. Preferably, the nail is driven almost home by the rotative drilling movement so that one, or at most, only a few impact blows will serve to drive it home.

Referring to the drawings, a pair of nail gripping jaws 1, 1' are provided which are carried on pins 2, 2' pivotally mounted in suitable self-lubricating sleeves 3, 3' carried by a collar 4. Said collar, in turn, is mounted on the lower end of a rotatable member, preferably a tube 5 mounted for rotation in bearings 6, 7. The tube 5 may be rotated in any convenient manner, as by a driving pulley 8 secured to the upper end of the tube. The bearings 6, 7 are mounted in the horizontal arms 9, 10 of a movable frame 11 which is normally held in elevated position by springs 12 which rest on the fixed support 13.

Immediately below the collar 4 is a ring 14 surrounding a second ring 15 of self-lubricating material. The inner edge of the ring 15 engages the cam spacers 16, 16' of the outside surfaces of the gripping jaws, so that, as shown in Fig. 3, when the rings 14 and 15 are moved downwardly relative to the collar 4 and the gripping jaws, the ring 15 moving along the cam faces 16, 16' will cause the jaws to close to grip a nail N. It will be understood, of course, that the centrifugal force created by rotation of the tube, acting on the jaws, will normally keep the jaws open as shown in Figs. 1 and 2.

The ring 14 is connected to a link 17 which is connected to a manually operated lever 18 pivoted at 19 to a fixed support 20. The connection comprises a pin 21 which engages a slot 22 in the lever. The upper end of the link 17 is provided with a slot 23 engaging the pin 24 mounted on the arm 9 of frame 11.

In driving a nail, the operation is controlled by the lever 18. The tube 5, the collar 4 and the jaws 1, 1' are constantly rotated by the pulley 8 and when it is desired to drive a nail, the lever 18 is depressed a short distance to bring the jaws partially together. A nail is then dropped into the upper end of the tube and enters the jaws until the head of the nail rests on the shoulders 25 of the jaws. Thereupon, further depression of the lever 18 will first cause the jaws to grip the shank of the nail very tightly, and then, when the end of the slot 23 engages the pin 24, further movement will carry the entire frame 11 downwardly against the pressure of the spring 12. At this time if the point of the nail is held against a stationary workpiece, the longitudinal pressure applied through the nail as the assembly is depressed will cause the rotating nail to drill into the workpiece. This may be continued until the bottom faces of the jaws engage the workpiece. At this time, the lever 18 is moved upwardly thus releasing the jaws and leaving the nail partially embedded in the workpiece. Thereafter the driving of the nail may be completed by a blow, or a few blows of a hammer.

It will be understood that the invention may be variously modified and embodied within the scope of the subjoined claims.

I claim as my invention:

1. Apparatus for driving a nail, comprising a rotatable member, means for rotating said member about an axis, a pair of gripping jaws pivotally carried by said member and freely swingable toward and away from the axis of rotation thereof, said jaws being swung to open position by centrifugal force created by rotation of said member, and means to close said jaws to cause them to grip the shank of a nail while said member is rotating.

2. Apparatus as claimed in claim 1 in which said rotatable means is a tube through which the nail may move to be gripped by the jaws.

3. Apparatus as claimed in claim 1 in which said jaw closing means is a non-rotating ring engaging the outer faces of the jaws, and including a lever for operating said ring.

4. Apparatus as claimed in claim 1 including a lever for operating said jaw closing means, and means whereby continued motion of said lever, after said jaws have been closed, moves said rotatable member, gripping jaws and nail toward a workpiece.

5. Apparatus as claimed in claim 1 in which said jaws engage the nail immediately below the head.

No references cited.